UNITED STATES PATENT OFFICE.

JAMES BEMIS, OF DES MOINES, IOWA.

SALVE.

SPECIFICATION forming part of Letters Patent No. 228,724, dated June 15, 1880.

Application filed February 16, 1880.

*To all whom it may concern:*

Be it known that I, JAMES BEMIS, of Des Moines, in the county of Polk and State of Iowa, have invented a new and useful Medical Compound, of which the following is a specification.

My compound is a hoof-salve specially adapted to cure split hoofs and contracted and bound hoofs of animals. It also cures sores, bruises, sprains, and wounds on persons and animals of every kind that deserve humane treatment.

To fill one hundred (100) boxes or cans that will each contain four ounces of the salve, I mix the following-named ingredients, in proportions and manner as follows: alcohol, six pints; spirits of turpentine, four pints; neat's-foot oil, three pints; spirits of camphor, one pint; aqua-ammonia, one pint; beef's gall, one pint; sassafras-oil, four ounces; origanum-oil, three ounces; cedar-oil, two ounces; laudanum, two ounces; pulverized or dissolved sal-soda, four ounces; bees-wax, five and one-half pounds; lard, eight and one-half pounds; rosin, five and one-half pounds. These ingredients, in about the proportions named, I mix by first placing the bees-wax, lard, and rosin together in a vessel and melting them over a fire, and when so united and in liquid form I add all the other ingredients and thoroughly mix them to produce a salve that will be semi-fluid while warm, and that can be readily poured into cans to be sealed up and labeled as required for convenience, as an article of merchandise. When cool in the cans it will be a stiff salve, that can be readily shipped and handled and easily applied for most of the purposes contemplated in the manner that healing-salves are generally used; but when used on animal-hoofs it should be made hot before it is applied, or a hot iron held close to the hoof to melt and heat the salve and cause it to penetrate the horny substance of the hoof.

For split hoofs, bound hoofs, hardened frogs, and kindred ailments in the hoof, the affected part should be thoroughly saturated with my compound every other day, and from three to six applications will be sufficient in ordinary cases to soften and heal the parts and to restore a healthy circulation.

To start a new growth of hoof I apply the salve around the crown of the hoof.

Any quantity of my new medical compound may be readily produced from the ingredients named by mixing them in about the proportions and manner specified, to aid in relieving afflicted persons and animals.

I claim as my invention—

The hereinbefore-described hoof-salve, composed of alcohol, spirits of turpentine, neat's-foot oil, spirits of camphor, aqua-ammonia, beef-gall, sassafras-oil, origanum-oil, cedar-oil, laudanum, sal-soda, bees-wax, lard, and rosin, substantially as set forth, for the purposes specified.

JAMES BEMIS.

Witnesses:
 FRANK W. HEERS,
 R. G. ORWIG.